United States Patent
Radke et al.

(10) Patent No.: US 9,664,061 B2
(45) Date of Patent: May 30, 2017

(54) EXHAUST-GAS TURBOCHARGER

(71) Applicant: BorgWarner Inc., Auburn Hills, MI (US)

(72) Inventors: Urban Radke, Bruchmuehlbach-Miesau (DE); Nermin Osmanovic, Marnheim (DE)

(73) Assignee: BorgWarner Inc., Auburn Hills, MI (US)

( * ) Notice: Subject to any disclaimer, the term of this patent is extended or adjusted under 35 U.S.C. 154(b) by 345 days.

(21) Appl. No.: 14/396,118

(22) PCT Filed: Apr. 19, 2013

(86) PCT No.: PCT/US2013/037325
§ 371 (c)(1),
(2) Date: Oct. 22, 2014

(87) PCT Pub. No.: WO2013/163023
PCT Pub. Date: Oct. 31, 2013

(65) Prior Publication Data
US 2015/0118029 A1    Apr. 30, 2015

(30) Foreign Application Priority Data
Apr. 27, 2012   (DE) .................. 10 2012 008 466

(51) Int. Cl.
| *F01D 17/16* | (2006.01) |
| *F02B 37/24* | (2006.01) |
| *F02B 39/00* | (2006.01) |
| *F01D 9/04* | (2006.01) |

(52) U.S. Cl.
CPC ............. *F01D 17/16* (2013.01); *F01D 9/041* (2013.01); *F01D 17/165* (2013.01); *F02B 37/24* (2013.01); *F02B 39/00* (2013.01); *F05D 2220/40* (2013.01); *F05D 2230/232* (2013.01); *F05D 2250/90* (2013.01); *F05D 2260/50* (2013.01); *Y02T 10/144* (2013.01)

(58) Field of Classification Search
CPC ..... F01D 17/165; F05D 2250/90; F02B 37/24
See application file for complete search history.

(56) References Cited

U.S. PATENT DOCUMENTS

| 4,679,984 A * | 7/1987 | Swihart ................. F01D 17/165 415/163 |
| 4,804,316 A | 2/1989 | Fleury |
| 7,001,142 B2 * | 2/2006 | Knauer ................. F01D 17/165 415/160 |

(Continued)

OTHER PUBLICATIONS

International Search Report in International Application No. PCT/US2013/037325 dated Jul. 23, 2013.

*Primary Examiner* — Ninh H Nguyen
(74) *Attorney, Agent, or Firm* — Eric L. Doyle; Stephan A. Pendorf; Patent Central LLC

(57) ABSTRACT

An exhaust-gas turbocharger which has a radial bearing with a simple design which can quickly and easily be mounted. A pin/rolling roller arrangement is provided as the radial bearing. The pin is in this case fixed on the vane bearing ring. The rolling roller is placed onto the pin and, in the mounted state, an inner wall region of the unison ring is supported on the rolling roller mounted rotatably on the pin.

12 Claims, 3 Drawing Sheets

(56) References Cited

U.S. PATENT DOCUMENTS

| | | | |
|---|---|---|---|
| 7,001,143 B2* | 2/2006 | Vogiatzis | F01D 5/141 |
| | | | 415/163 |
| 7,559,199 B2* | 7/2009 | Sausse | F01D 17/165 |
| | | | 415/159 |
| 2004/0096317 A1 | 5/2004 | Scholz et al. | |
| 2006/0112690 A1 | 6/2006 | Hemer | |
| 2008/0240906 A1 | 10/2008 | Barthelet et al. | |
| 2010/0008774 A1 | 1/2010 | Scholz et al. | |
| 2011/0138805 A1 | 6/2011 | Barthelet et al. | |

* cited by examiner

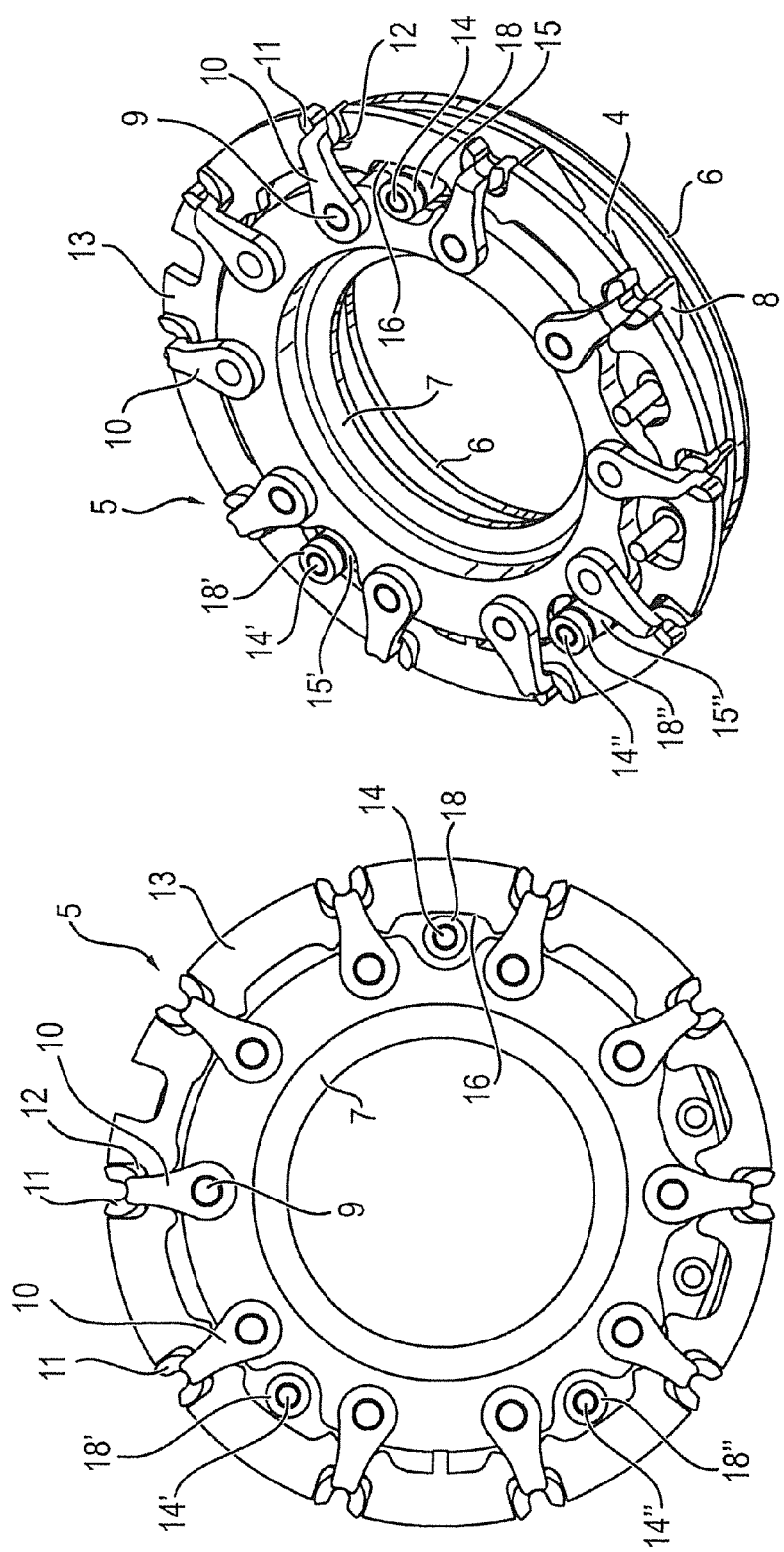

EXHAUST-GAS TURBOCHARGER

BACKGROUND OF THE INVENTION

Field of the Invention

The invention relates to an exhaust-gas turbocharger.

Description of the Related Art

In the case of such an exhaust-gas turbocharger, provision is made of a variable turbine geometry (VTG), in which guide vanes are adjusted by means of a unison ring. The unison ring is in this respect mounted circumferentially by way of a radial bearing on the vane bearing ring.

It is an object of the present invention to provide an exhaust-gas turbocharger which has a radial bearing with a simple design which can quickly and easily be mounted.

BRIEF SUMMARY OF THE INVENTION

According to the invention, a pin/rolling roller arrangement is provided as the radial bearing. The pin is in this case fixed on the vane bearing ring. The rolling roller is placed onto the pin and, in the mounted state, an inner wall region of the unison ring is supported on the rolling roller mounted rotatably on the pin.

The dependent claims contain advantageous developments of the invention.

The invention further concerns a VTG cartridge which can be marketed independently.

BRIEF DESCRIPTION OF THE SEVERAL VIEWS OF THE DRAWINGS

Further details, features and advantages of the invention become apparent from the following description of exemplary embodiments with reference to the drawing, in which:

FIG. 2 shows a plan view of a first embodiment of a VTG cartridge according to the invention, FIG. 3 shows a perspective view of the VTG cartridge shown in FIG. 2.

DETAILED DESCRIPTION OF THE INVENTION

Figure 1:
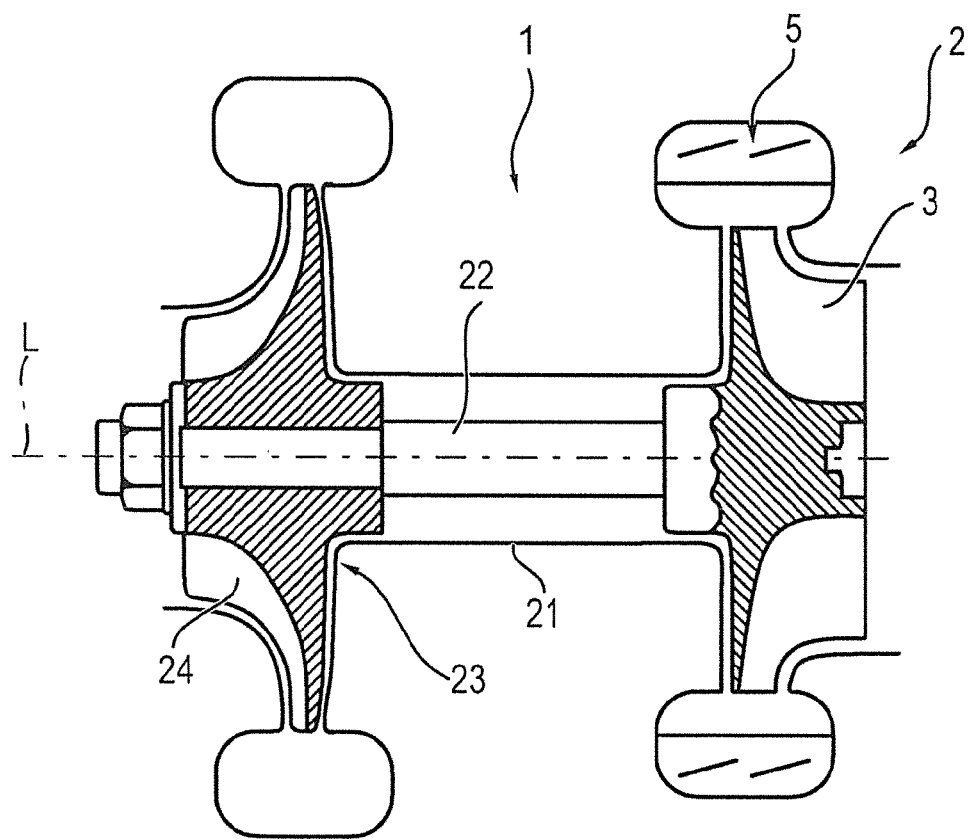
FIG. 1 shows a schematically greatly simplified illustration of an exhaust-gas turbocharger according to the invention.

FIG. 1 shows a schematically greatly simplified basic illustration of an exhaust-gas turbocharger 1 according to the invention, which has a charger axis of rotation L.

The exhaust-gas turbocharger 1 also has a turbine 2, which comprises a turbine wheel 3 surrounded by an intake duct 4, which is provided with a so-called VTG cartridge 5. This VTG cartridge 5 will be described in detail hereinbelow with reference to FIGS. 2 to 4.

The exhaust-gas turbocharger 1 also of course has all the other common parts of an exhaust-gas turbocharger, such as a rotor 22, which is mounted rotatably in a bearing housing 21 and which bears the turbine wheel 3 at one end and a compressor wheel 24 of a compressor 23 at the other end. These parts are likewise shown only in schematically greatly simplified form in FIG. 1, since they are not of importance for explaining the principles of the present invention.

Figure 4:
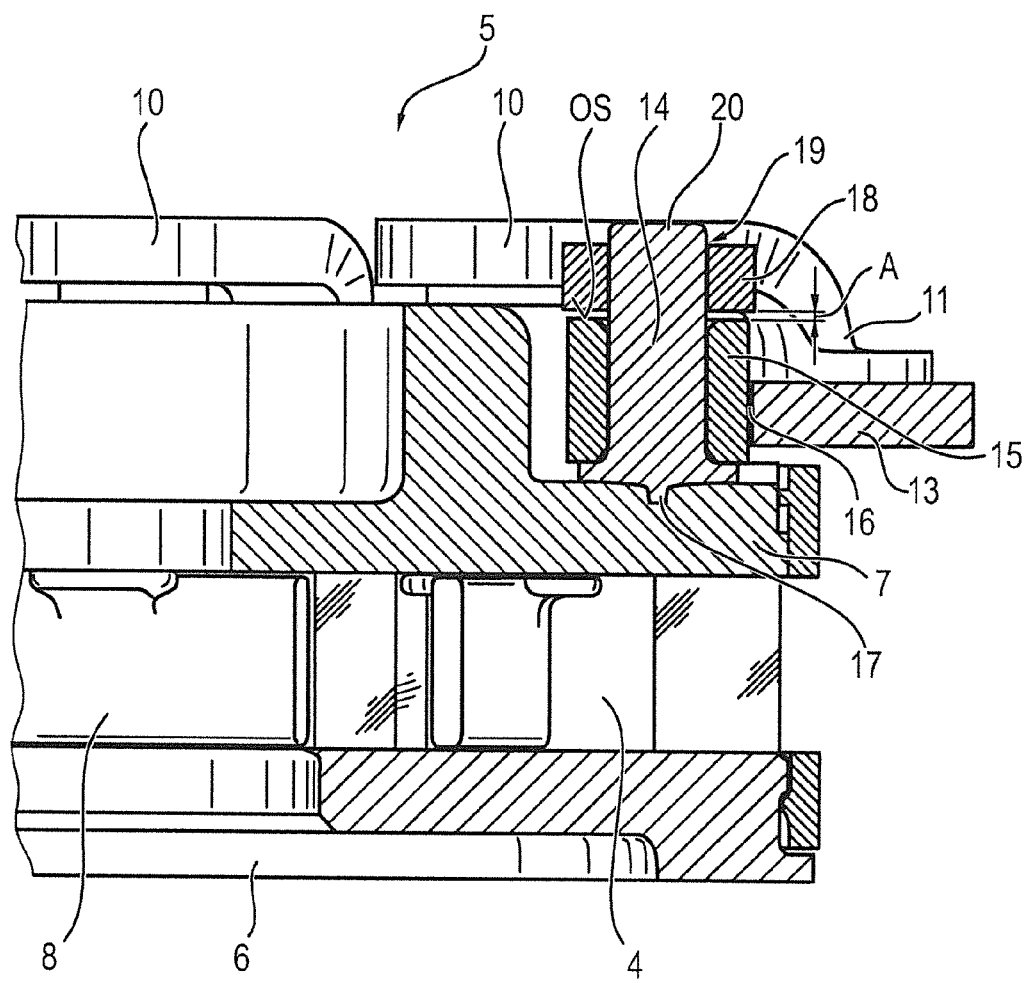
FIG. 4 shows a sectional partial illustration of the VTG cartridge according to the invention shown in FIGS. 2 and 3.

The VTG cartridge, which, as mentioned, will be explained in detail hereinbelow with reference to FIGS. 2 to 4, is likewise shown in greatly schematically simplified form.

A VTG cartridge is understood to mean a structural unit which, between a vane bearing ring 7 and a washer 6, delimits an intake duct 4 for the passage of exhaust gases to the turbine wheel 3. Furthermore, a VTG cartridge 5 of this type has a plurality of vanes, which are arranged in the intake duct 4 and of which FIGS. 3 and 4 show one vane designated 8 as a representative example of all vanes bearing the corresponding reference numeral. The vanes 8 can be moved rotatably in the vane bearing ring 7 between a closed and an open position. For this purpose, the vanes 8 have vane shafts 9 each having an axis of rotation. The vane shafts 9 in turn are connected to vane levers 10, of which two vane levers are denoted in each case in FIGS. 2 and 3 with the reference numeral 10. As FIGS. 2 and 3 show, the embodiment shown there has 10 such, preferably cranked vane levers, in each case of identical design.

Each vane lever 10 has a lever head 11, which engages into an associated groove 12 in a unison ring 13. FIG. 2 above all shows in this respect that the unison ring 13 surrounds the vane bearing ring 7 on the outside, i.e. along the outer circumference thereof.

For radially mounting the unison ring 13, provision is made of a radial bearing, which according to the invention is formed by at least one pin 14 fixed on the vane bearing ring 7. A rolling roller 15, against which an inner wall region 16 of the unison ring 13 bears, is placed onto the pin 14.

The pin 14 is preferably butt-welded onto the vane bearing ring 7, which is evident in particular from the illustration in FIG. 4, the pin 14 having a small journal 17 which serves to ignite the arc upon welding and in the process completely melts down, such that the pin 14 is joined to the vane bearing ring 7 in an abutting manner.

A lock washer 18 is fixed to the free end 20 of the pin 14 and, in a particularly preferred embodiment, is fastened to the end 20 of the pin 14 at a distance A (see FIG. 4) from the upper side OS of the rolling roller.

As FIGS. 2 and 3 illustrate, in this particularly preferred embodiment a total of three pin/rolling roller pairs denoted by the reference numerals 14, 14', 14" and 16, 16', 16" are provided as the radial bearing. Furthermore, a lock washer 18, 18', 18" is of course assigned to each of these pairs.

Finally, FIGS. 3 and 4 show that the vane levers 10 have a cranked form, since the plane of the grooves 12 into which the lever heads 11 engage is offset in relation to the upper side of the vane bearing ring 7, as is evident in particular from FIG. 4.

In addition to the above written disclosure, reference is hereby explicitly made to the illustrative representation of the invention in FIGS. 1 to 4 to supplement the disclosure of the invention.

LIST OF REFERENCE SIGNS

1 Exhaust-gas turbocharger
2 Turbine
3 Turbine wheel
4 Intake duct
5 VTG cartridge
6 Washer
7 Vane bearing ring
8 Vanes
9 Vane shafts
10 Vane lever 11 Lever heads
12 Grooves
13 Unison ring
14, 14', 14" Pin
15, 15', 15" Rolling roller
16 Inner wall region
17 Journal
18, 18', 18" Lock washer
19 Weld
20 End of the pin 14
OS Upper side
L Charger longitudinal axis
A Distance

The invention claimed is:

1. An exhaust-gas turbocharger (1) having
   a turbine (2),
      which has a turbine wheel (3) surrounded by an intake duct (4), and
   a VTG cartridge (5), with
      a washer (6) and a vane bearing ring (7), which delimit the intake duct (4),
      a plurality of vanes (8), which are arranged in the intake duct (4) and are mounted in the vane bearing ring (7) by way of rotatable vane shafts (9), which are connected to vane levers (10), the lever heads (11) of which engage into associated grooves (12) in a unison ring (13), which surrounds the vane bearing ring (7) on the outside, and
      a radial bearing between the vane bearing ring (7) and the unison ring (13),
   wherein
   the radial bearing has at least one pin (14), which is fixed on the vane bearing ring (7) and onto which a rolling roller (15) is placed, against which an inner wall region (16) of the unison ring (13) bears, wherein a lock washer (18) is fastened on the free end (20) of the pin (14) at a defined distance (A) from the upper side (OS) of the rolling roller.

2. The exhaust-gas turbocharger as claimed in claim 1, wherein the pin (14) is butt-welded onto the vane bearing ring (7).

3. The exhaust-gas turbocharger as claimed in claim 1, wherein the lock washer (18) is fastened on the end (20) by means of a weld (19).

4. The exhaust-gas turbocharger as claimed in claim 1, wherein the radial bearing has three pins (14, 14', 14") and rolling rollers (15, 15', 15") placed onto the latter.

5. The exhaust-gas turbocharger as claimed in claim 4, wherein the pin/rolling roller pairs are arranged at identical angular distances circumferentially on the vane bearing ring (7).

6. The exhaust-gas turbocharger as claimed in claim 1, wherein the vane levers (10) are cranked.

7. A VTG cartridge (5) of an exhaust-gas turbocharger (1), having
   a washer (6) and a vane bearing ring (7), which delimit an intake duct (4),
   a plurality of vanes (8), which are arranged in the intake duct (4) and are mounted in the vane bearing ring (7) by way of rotatable vane shafts (9), which are connected to vane levers (10), the lever heads (11) of which engage into associated grooves (12) in a unison ring (13), which surrounds the vane bearing ring (7) on the outside, and
   a radial bearing between the vane bearing ring (7) and the unison ring (13),
   wherein
   the radial bearing has at least one pin (14), which is fixed on the vane bearing ring (7) and onto which a rolling roller (15) is placed, against which an inner wall region (16) of the unison ring (13) bears, wherein a lock washer (18) is fastened on the free end (20) of the pin (14) at a defined distance (A) from the upper side (OS) of the rolling roller.

8. The VTG cartridge as claimed in claim 7, wherein the pin (14) is butt-welded onto the vane bearing ring (7).

9. The VTG cartridge as claimed in claim 7, wherein the lock washer (18) is fastened on the end (20) by means of a weld (19).

10. The VTG cartridge as claimed in claim 7, wherein the radial bearing has three pins (14, 14', 14") and rolling rollers (15, 15', 15") placed onto the latter.

11. The VTG cartridge as claimed in claim 10, wherein the pin/rolling roller pairs are arranged at identical angular distances circumferentially on the vane bearing ring (7).

12. The VTG cartridge as claimed in claim 7, wherein the vane levers (10) are cranked.

* * * * *